United States Patent [19]

Yasuda et al.

[11] Patent Number: 4,853,672
[45] Date of Patent: Aug. 1, 1989

[54] STEERING ANGLE DETECTOR

[75] Inventors: Toru Yasuda; Yoshimichi Kawamoto; Masaru Abe; Takashi Kohata, all of Saitama, Japan

[73] Assignee: Honda Giken Kogyo Kabushiki Kaisha, Tokyo, Japan

[21] Appl. No.: 88,909

[22] Filed: Aug. 24, 1987

[30] Foreign Application Priority Data

Aug. 22, 1986 [JP] Japan .................................. 61-196703
Feb. 25, 1987 [JP] Japan ............................ 62-26965[U]

[51] Int. Cl.⁴ .............................................. B60Q 1/00
[52] U.S. Cl. ................................. 340/465; 180/79.1
[58] Field of Search ............ 340/52 R, 686; 33/1 PT, 33/264, 600; 116/31; 280/91; 180/140, 141, 142, 79

[56] References Cited

U.S. PATENT DOCUMENTS

| 4,645,025 | 2/1987 | Ohe et al. ............................ 180/79.1 |
| 4,671,371 | 1/1987 | Shimizu ............................... 180/79.1 |
| 4,715,461 | 12/1987 | Shimizu ............................... 180/79.1 |
| 4,719,396 | 1/1988 | Shimizu ............................... 180/6.44 |

FOREIGN PATENT DOCUMENTS

| 1301915 | 4/1970 | Fed. Rep. of Germany . |
| 3500793 | 7/1985 | Fed. Rep. of Germany . |
| 56-146670 | 11/1981 | Japan . |
| 2142291 | 1/1985 | United Kingdom . |
| 2163109 | 2/1986 | United Kingdom . |

Primary Examiner—Joseph A. Orsino, Jr.
Assistant Examiner—Annie H. Chau
Attorney, Agent, or Firm—Irving M. Weiner; Joseph P. Carrier; Pamela S. Burt

[57] ABSTRACT

A steering angle detector comprises a differential transformer. The steering angle detector includes a rod member extending substantially transversely of the vehicle body and axially movable in response to steering action of the vehicle body, a metallic core mounted on the rod member, and primary and secondary coils disposed around the core in slightly spaced relation thereto.

12 Claims, 6 Drawing Sheets

STEERING ANGLE DETECTOR

BACKGROUND OF THE INVENTION

1. Field of the Invention

The present invention relates to a steering angle detector, and more particularly to a steering angle detector for use as a front wheel steering angle detector in a four wheel steering system.

2. Description of the Relevant Art

Four wheel steering systems for turning rear wheels in relation to the turning of front wheels have a steering angle detector for obtaining front wheel steering angle information to control the turning angle of the rear wheels. As disclosed in Japanese Laid-Open Patent Publication No. 56-146670, a conventional steering angle detector comprises a potentiometer, an encoder, or the like mechanically coupled to a steering shaft for obtaining steering angle information pertaining to the angle through which a steering wheel is turned.

The mechanism for transmitting steering power from the steering wheel to the dirigible wheels suffers mechanical backlashes, twists, and other distortions, and the steering wheels have a certain play. Therefore, the turning angle of the steering wheel does not accurately correspond to the actual turning angle of the dirigible wheels, and it is difficult to obtain accurate steering angle information from the turning angle of the steering wheel.

On the other hand, with a detector that is mechanically coupled to a component of the steering system tends to malfunction due to vibrations or shocks applied to the detector by the component, or to be adversely affected by dust or environmental changes such as temperature changes.

Generally in four wheel steering systems, a gear box for turning the rear wheels is mounted on a vehicle body through a highly rigid support structure, and a gear box for turning front wheels is elastically mounted on the vehicle body in order to absorb vibration or external forces from the front wheels to the steering wheel. This is because vibration or external forces from the rear wheels are not transmitted to the steering wheel in a four wheel steering system in which the rear wheel turning gearbox is mechanically independent of the front wheel turning gearbox and the rear wheels are turned by an actuator in relation to the turning of the front wheels. It is also because the action for turning the rear wheels is required to be highly accurate with respect to the vehicle body as the turning angle of the rear wheels is smaller than the turning angle of the front wheels.

During an initial period of the front wheel turning action, the front wheel turning gearbox is moved, together with a rod member, transversely of the vehicle body because the front wheel turning gearbox is elastically mounted on the vehicle body. Where a steering angle detector is assembled in the front wheel turning gearbox, therefore, the steering angle detector may fail to detect a steering angle regardless of the fact that the front wheels are actually turned.

SUMMARY OF THE INVENTION

It is an object of the present invention to provide a steering angle detector which is capable of detecting an actual wheel turning or steering angle with high accuracy, is less subject to vibration or shocks from dirigible wheels or adverse effects by environmental changes such as temperature changes, and can accurately detect the turning of front wheels caused by the turning action of a steering wheel even with a front wheel steering gearbox being elastically mounted on a vehicle body.

A steering angle detector in a vehicle body according to the present invention includes a rod member extending substantially transversely of the vehicle body and axially movable in response to steering action of the vehicle body, a metallic core mounted on the rod member, and primary and secondary coils disposed around the core in slightly spaced relation thereto.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
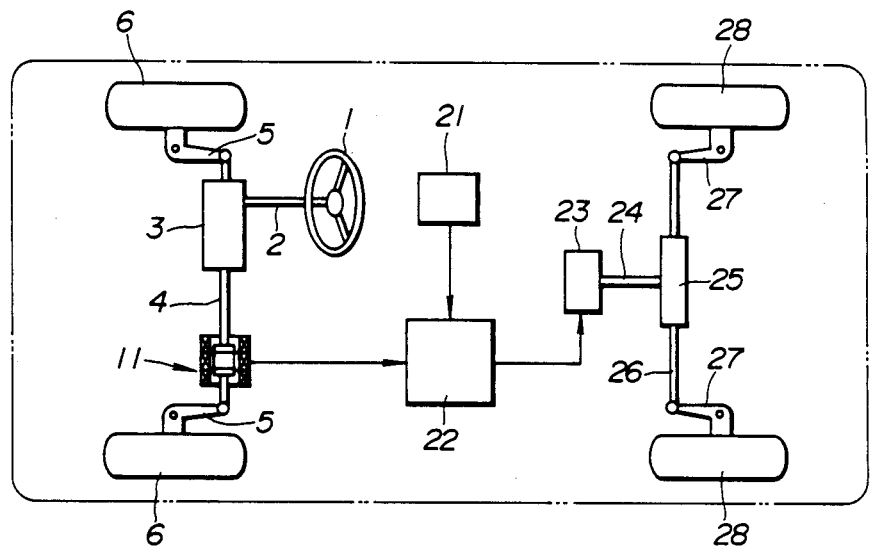
FIG. 1 is a schematic plan view of a front wheel steering system according to a first embodiment of the present invention.

27 As shown in FIG. 1, rotation of a steering wheel 1 is transmitted through a steering shaft 2 to a front wheel turning gearbox 3 and converted by a rack-and-pinion mechanism in the gearbox 3 to axial linear movement of a rack shaft or rod member 4, which is then transmitted through knuckle arms 5 to front wheels 6 to turn them.

Figure 2:
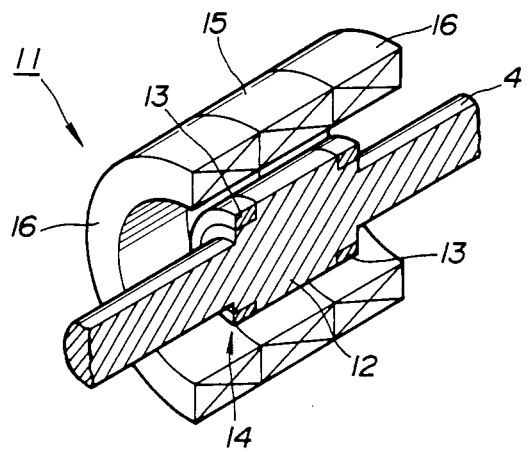
FIG. 2 is an enlarged sectional perspective view of a steering angle detector shown in FIG. 1.

A steering angle detector 11 is mounted on the rack shaft 4 projecting from the gearbox 3. As shown in FIG. 2, the rack shaft 4 has a larger-diameter portion 12 over which axially spaced metallic rings 13 of aluminum are fitted at opposite ends of the larger-diameter portion 12, thus providing a metallic core 14 serving as the core of a differential transformer. A primary coil 15 and two 13 secondary coils 16 disposed one on each side of the primary 14 coil 15 are fixed to a vehicle body and disposed around the larger-diameter portion 12 in slightly spaced relation thereto. The core 14 on the rack shaft 4, the primary coil 15, and the secondary coils 16 jointly constitute the steering angle detector 11.

The steering angle detector 11 comprises a differential transformer. With the primary coil 15 being energized with a constant AC voltage applied thereto, when the core 14 is moved in the axial direction, the secondary coils 16 produce an output voltage commensurate with the amount of movement of the core 14 from a neutral position or zero point of the core 14. The output voltage from the secondary coils 16 is utilized to directly detect the direction and amount of movement of the rack shaft 4 with respect to the vehicle body, and hence to obtain accurate information on the steering direction and angle of the front wheels 6.

The front wheel steering information thus detected by the steering angle detector 11 is applied, together with vehicle speed information detected by a vehicle speed detector 21 (FIG. 1), for example, to a control unit 22, which then applies a control signal based on the front wheel steering information and the vehicle speed information to a motor 23 of a rear wheel steering device. The motor 23 has a drive shaft 24 coupled to a rear wheel steering gearbox 25. Rotation of the drive shaft 24 is converted by a rack-and-pinion mechanism in the rear wheel steering gearbox 25 to linear movement of a rack shaft 26 which extends transversely of the vehicle body. The linear movement of the rack shaft 26 is applied via knuckle arms 27 to rear wheels 28 to turn them.

Figure 3:
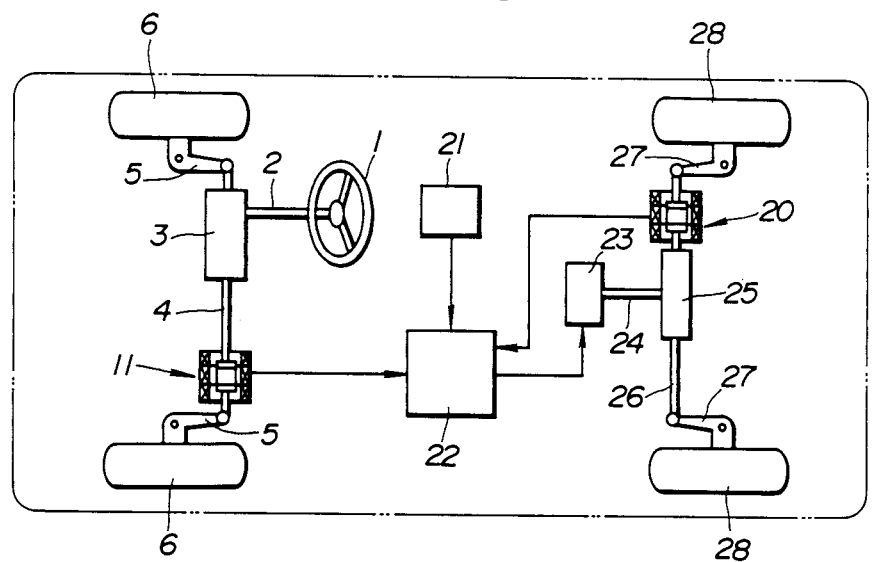
FIG. 3 is a schematic plan view of a front wheel steering system according to a second embodiment of the present invention.
Figure 4:
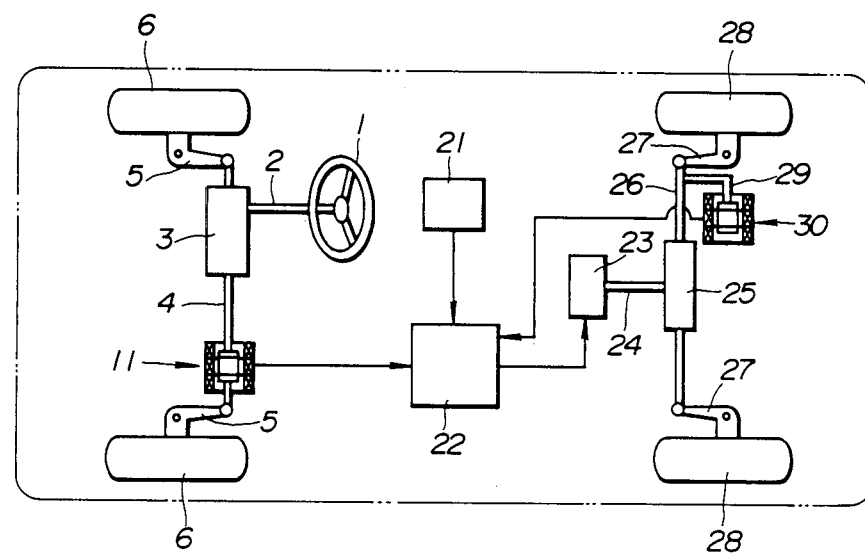
FIG. 4 is a schematic plan view of a front wheel steering system according to a third embodiment of the present invention.

FIGS. 3 and 4 show other embodiments in which a steering angle detector of the invention is also incorporated in a rear wheel steering device. According to the embodiment of FIG. 3, a steering angle detector 11 is disposed on the rack shaft 4 for turning the front wheels 6, and a similar steering angle detector 20 is disposed on the rack shaft 26 for turning the rear wheels 28. Rear wheel steering information detected by the rear wheel steering angle detector 20 is supplied to the control unit 22.

In the embodiment of FIG. 4, a rod 29 is disposed parallel to and integral with the rack shaft 26, and a steering angle detector 30 is disposed on the rod 29 for detecting axial movement of the rod 29. The other structural details are the same as those of the embodiment illustrated in FIG. 3.

Figure 5:
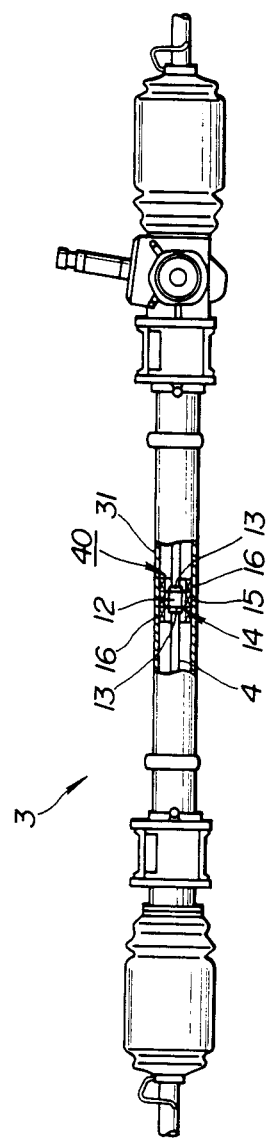
FIG. 5 is a front elevational view, partly cut away, of a steering gearbox according to a fourth embodiment of the present invention.

In each of the above embodiments, the steering angle detector is disposed on a portion of the rack shaft projecting from the gearbox. However, a steering angle detector may be mounted on a portion of the rack shaft which is housed in the gearbox. More specifically, as shown in FIG. 5, a portion of the rack shaft 4 housed in a cylindrical housing 31 of the gearbox 3 has a core 14 comprising a larger-diameter portion 12 and metallic rings 13 in the same manner as shown in FIG. 2. A primary coil 15 and secondary coils 16 adjacent thereto on opposite sides thereof are fixed to the inner peripheral surface of the cylindrical housing 31. A steering angle detector 40 constructed of the core 14 and the coils 15, 16 is thus accommodated in the gearbox 3. The rear wheel turning gearbox may be of the same construction.

With the steering angle detector 40 disposed in steering gearbox 3, a space saving arrangement is provided, and the coils 15, 16 can be supported in position within the gearbox 3 without employing a support member such as a bracket.

The core 14, which serves as the core of a differential transformer, may be of various different configurations as shown in FIGS. 6(a) through 6(f).

Figure 6:
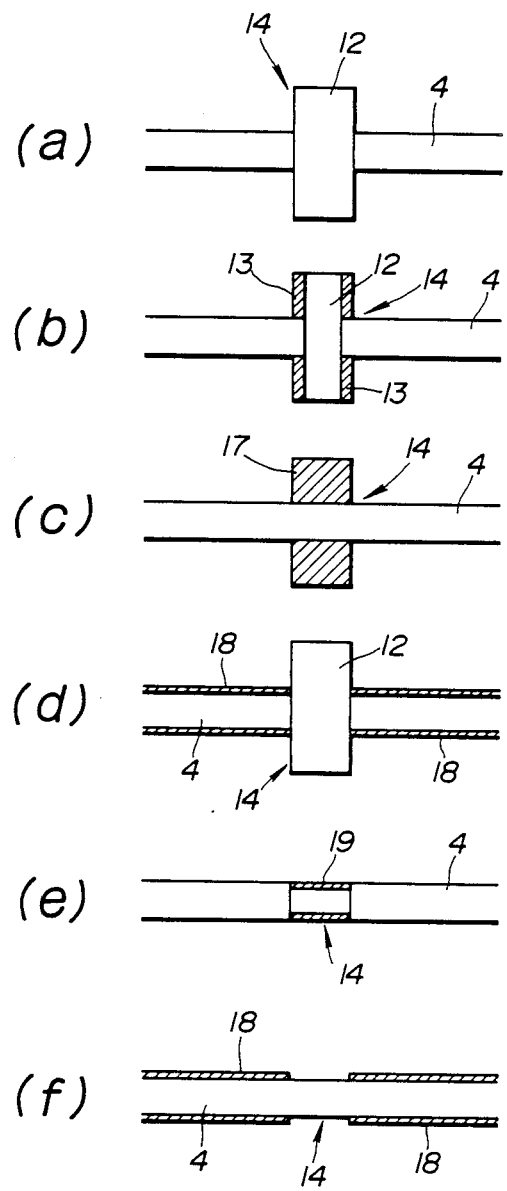
FIGS. 6(a) through 6(f) are front elevational and cross-sectional views showing cores according to different modifications.

FIG. 6(a) shows a simple structure in which the core comprises only a larger-diameter portion 12 of the rack shaft 4. In the structure of FIG. 6(b), two metallic rings 13 are mounted on the opposite ends of a larger-diameter portion 12, as shown in FIG. 2. In FIG. 6(c), a larger-diameter metallic ring 17 of a nonmagnetic material such as aluminum is mounted on the rack shaft 4. According to the modification shown in FIG. 6(d), magnetically shielding coating layers 18 are coated around the rack shaft 4 on opposite sides of the larger-diameter portion 12. The rack shaft 4 may have a groove defined therearound, and a metallic ring 19 of the same diameter as that of the rack shaft 4 may be fitted in the groove as shown in FIG. 6(e). FIG. 6(f) shows an arrangement in which magnetically shielding coating layers 18 are coated around the rack shaft 4 except for a portion 14 serving as a core.

The type shown in FIG. 6(a) cannot produce a definite signal unless the diameter of the larger-diameter portion 12 is considerably larger than the diameter of the rack shaft 4 since a signal from the periphery of the rack shaft 4 other than the larger-diameter portion 12 is also picked up. If the larger-diameter portion 12 were excessively large in diameter, it would take up a large space and become too heavy. The construction of FIG. 6(c) is advantageous in that the nonmagnetic metallic material of the core 14 can absorb lines of magnetic force as an eddy current, and hence the rack shaft 4 and the core 14 clearly differ in property, so that a large output signal can be generated. An experiment indicated that the core design of FIG. 6(c) produced a signal higher in level than those produced by the types of FIGS. 6(a) and 6(b), and was best in detecting accuracy.

The principles of the present invention are applicable to a ball-screw-type steering device employing an electric motor, as well as the rack-and-pinion steering device. Although not shown, the present invention is also applicable to a rear wheel turning device of the type which is mechanically coupled to a front wheel turning device and which includes a joint rod movable transversely of the vehicle body through an eccentric pin, a planetary gear mechanism, and other members for turning the rear wheels. In summary, the differential transformer of a steering angle detector may be disposed on a rod member such as a rack shaft, a screw shaft, a joint rod, or a tie rod which serves to apply steering output power to dirigible wheels and is movable transversely of the vehicle body.

Figure 7:
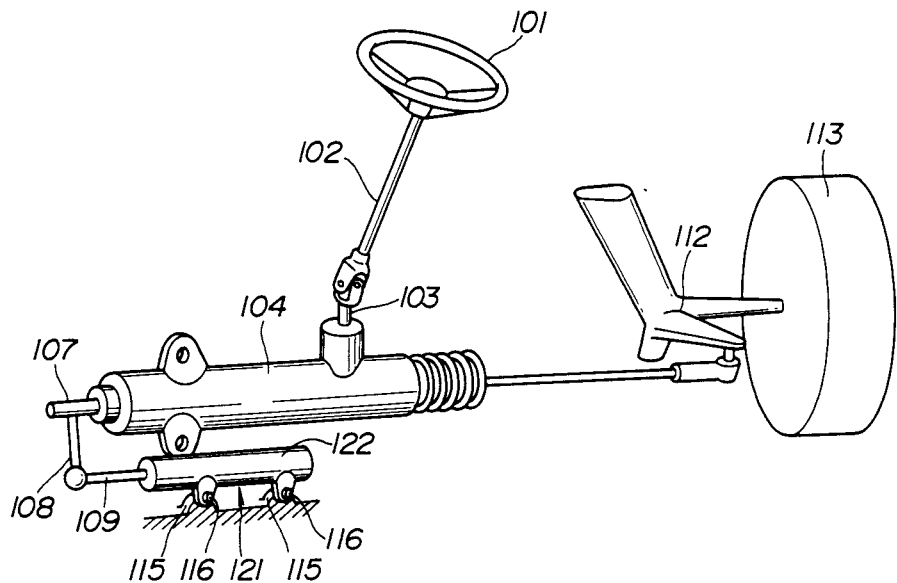
FIG. 7 is a perspective view of a front wheel steering device according to a fifth embodiment of the present invention.
Figure 8:
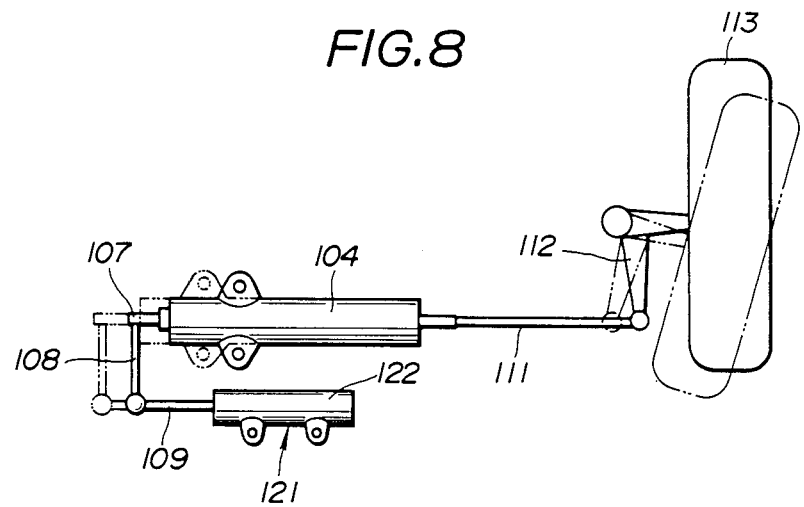
FIG. 8 is a plan view of the front wheel steering device illustrated in FIG. 7.

In FIGS. 7 and 8 which show another embodiment of the present invention, a steering wheel 101 is coupled through a steering shaft 102 to a pinion shaft 103 extending from a front wheel turning gearbox 104 having a rack shaft 107 extending as a rod member in the transverse direction of a vehicle body. The rack shaft 107 has opposite ends coupled through tie rods 111 (only one shown) to respective knuckle arms 112 on which front wheels 113 are rotatably supported. The gearbox 104 is slightly movably mounted on the vehicle body by an elastic mount in the known manner.

To one end of the rack shaft 107 projecting from the gearbox 104, there is fixed a rod 108 projecting perpendicularly from the rack shaft 107 and joined to a detecting rod 109 extending parallel or substantially parallel to the rack shaft 107 into a front wheel steering angle detector 121. More specifically, the front wheel steering angle detector 121 has a casing 122 in which the detecting rod 109 is inserted for movement in the transverse direction of the vehicle body. The casing 122 is attached to brackets 115 on the vehicle body by means of bolts 116.

The front wheel steering angle detector 121 is of a non-contact, differential transformer type which is not in physical contact with the detecting rod 109.

A front wheel steering angle signal produced by the steering angle detector 121 is sent to a control unit or CPU which generates an output control signal to control operation of an actuator such as an electric motor in a rear wheel turning device. The steering angle detector 121 is incorporated in a four wheel steering (4WS) system in which the rear wheels are turned in the opposite direction to that of the front wheels when a steering wheel is turned through a large angle generally in a low- and medium-vehicle-speed range, and the rear wheels are turned in the same direction as that of the front wheels when the steering wheel is turned through a small angle generally in a high-vehicle-speed range.

The amount of movement of the rack shaft 107 with respect to the vehicle body can be directly be detected from axial movement of the detecting rod 109 moving with the rack shaft 107 by the front wheel steering angle detector 121 which is immovable transversely of the vehicle body. Therefore, even if the front wheel turning gearbox 104 is elastically mounted on the vehicle body, the front wheel turning action with respect to the vehicle body can be accurately be detected in an entire range of turning movement of the front wheels which is caused by the steering wheel 101. The rear wheels can be turned in following relation to the front wheels at all times.

When the front wheels 113 are turned as indicated by the imaginary lines in FIG. 8 by a lateral force, such as a lateral wind, while the vehicle is running along a straight line at a high speed, such turning movement of the front wheels is detected by the front wheel steering angle detector 121 to enable the rear wheels to turn in the same direction as that of the front wheels. Consequently, the running stability of the vehicle can be increased without adding a separate corrective device to the steering control system.

Figure 9:
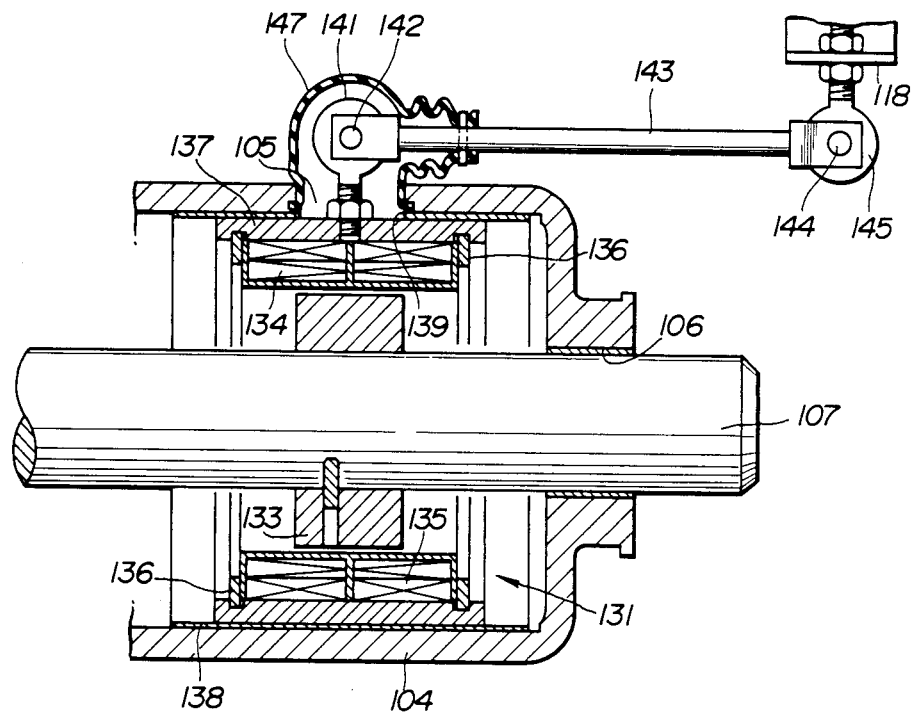
FIG. 9 is a fragmentary cross-sectional view of a steering gearbox according to a sixth embodiment of the present invention.

FIG. 9 shows a still further embodiment of the present invention. A front wheel steering angle detector 131 is in the form of a differential transformer comprising a metallic core 133 disposed on and coupled by a pin 132 to the outer periphery of a rack shaft 107 extending through a gearbox 104, and a primary coil 134 and secondary coils 135 housed in the gearbox 104 and disposed around the core 133. The coils 134, 135 are retained in a cylindrical casing 137 by means of oppositely disposed retaining rings 136. The cylindrical casing 137 is slidably fitted in a sleeve-like slide bearing 138.

The slide bearing 138 is fixed to the inner periphery of the gearbox 104. The slide bearing 138 and the gearbox 104 have concentric holes 139, 105, respectively, through which projects a screw member 141 radially threaded in the casing 137. A connecting rod 143 has one end pivotally coupled to the screw member 141 by means of a pin 142. The connecting rod 143 extends parallel or substantially parallel to the rack shaft 107 and has its opposite end pivotally coupled by a pin 144 to a screw member 145 which is threaded in a bracket 118 secured to the vehicle body.

The portions of the casing137 and the connecting rod 143 which are coupled to each other are covered with a dust seal 147. The rack shaft 107 is guided by a slide bearing 106 mounted in an end of the gearbox 104.

The connecting rod 143 is somewhat movable back and forth in a vertical direction in FIG. 9 and in a direction normal to the sheet of FIG. 9 because the opposite ends of the connecting rod 143 are pivotally supported. However, any movement of the casing 137 in the transverse direction of the vehicle body is substantially negligible.

With the arrangement of the present invention, as described above, steering angle information can be directly detected from a rod member serving as a member for applying steering output power to a dirigible wheel. Therefore, actual steering angle information can be accurately obtained without being affected by backlashes or twists of a steering device or environmental changes.

Since a differential transformer is employed as the steering angle detector, a steering direction and a steering angle can simultaneously be detected. As there is a gap between the core and the primary and secondary coils, i.e., the primary and secondary coils are out of contact with the rod member, the differential transformer is highly durable regardless of backlashes or twists of the rod member and entry of dust. Inasmuch as the differential transformer is highly resistant to environmental changes such as temperature changes, it can detect the steering angle highly reliably.

Breakage of the coils or conductors and contact failures can be easily detected simply by monitoring the voltage of the coils.

Even with a gearbox being elastically mounted on a vehicle body, the turning of front wheels with respect to the vehicle body can be accurately detected in an entire range of turning of the front wheels caused by a steering wheel. Thus, the rear wheels can be turned in following relation to the front wheels at all times.

Turning of the front wheels due to a lateral force such as a lateral wind while the vehicle is running straight at a high speed can also be detected, thereby to turn the rear wheels correspondingly. Thus, it is not necessary to provide the steering control device with a corrective device which effects corrective action taking into account the influence of a lateral force such a lateral wind.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A steering angle detector in a vehicle body including knuckle arms for rotatably supporting steerable wheels, comprising:

a rod member extending substantially transversely of the vehicle body and axially movable in response to steering action of the vehicle body, opposite ends of said rod member being connected to said knuckle arms;

a metallic core mounted around or mounted directly on said rod member; and primary and secondary coils disposed around said core in slightly spaced relation thereto.

2. A steering angle detector according to claim 1, wherein said rod member comprises a rack shaft in a steering gearbox.

3. A steering angle detector according to claim 1, wherein said rod member comprises a screw shaft in a steering gearbox.

4. A steering angle detector according to claim 1, wherein said core comprises a larger-diameter, intermediate portion of said rod member.

5. A steering angle detector according to claim 4, further including magnetically shielding coating layers coated on said rod member adjacent to said larger-diameter portion.

6. A steering angle detector according to claim 1, wherein said core comprises a larger-diameter portion of said rod member and a pair of nonmagnetic metallic rings mounted on said larger-diameter portion on opposite ends thereof.

7. A steering angle detector according to claim 1, wherein said core comprises a larger-diameter nonmagnetic metallic ring mounted on said rod member.

8. A steering angle detector according to claim 1, wherein said rod member has a groove defined therearound, said core comprising a metallic ring fitted in said groove and having an outside diameter which is substantially the same as the diameter of said rod member.

9. A steering angle detector according to claim 1, further including magnetically shielding coating layers coated on said rod member except for a portion thereof which serves as said core.

10. A steering angle detector according to claim 1, further including a steering gear box elastically mounted on said vehicle body, said rod member being operatively connected to a steering wheel through said steering gear box, said primary and secondary coils being mounted on said vehicle body immovably in a transverse direction of said vehicle body, independent of said steering gear box.

11. A steering angle detector in a vehicle body, comprising:
a rod member extending substantially transversely of the vehicle body and axially movable in response to steering action of the vehicle body;
a metallic core mounted on said rod member;
primary and secondary coils disposed around said core in slightly spaced relation thereto; and
a steering gear box elastically mounted on said vehicle body;
said rod member being operatively connected to a steering wheel through said steering gear box;
said primary and secondary coils being mounted on said vehicle body immovably in a transverse direction of said vehicle body independent of said steering gear box; and
said rod member comprising a detecting rod joined to and extending substantially parallel to a rack shaft movably disposed in said steering gear box, said detecting rod being axially movable with said rack shaft.

12. A steering angle detector according to claim 10, further including a casing housing said primary and secondary coils, and a support member coupling said casing to said vehicle body, said casing being relatively movably accommodated in said steering gearbox, said support member being disposed substantially parallel to said rod member for supporting said casing immovably in the transverse direction of said vehicle body.

* * * * *

UNITED STATES PATENT AND TRADEMARK OFFICE
CERTIFICATE OF CORRECTION

PATENT NO. : 4,853,672

DATED : August 1, 1989

INVENTOR(S) : Yasuda, et al

It is certified that error appears in the above-identified patent and that said Letters Patent is hereby corrected as shown below:

Column 1, line 30, delete "with".

Column 2, line 48, delete "27";
         line 60, delete "13";
         line 62, delete "14".

Column 4, line 31, after "present" delete the comma.

Signed and Sealed this

Second Day of October, 1990

*Attest:*

HARRY F. MANBECK, JR.

*Attesting Officer*      *Commissioner of Patents and Trademarks*